US012463366B2

(12) United States Patent
He

(10) Patent No.: US 12,463,366 B2
(45) Date of Patent: Nov. 4, 2025

(54) PHOTOVOLTAIC CONNECTOR WITH GOOD CONTACT PERFORMANCE

(71) Applicant: Dongguan City Jianghan Electronics Co., Ltd, Dongguan (CN)

(72) Inventor: Tiejun He, Dongguan (CN)

(73) Assignee: Dongguan City Jianghan Electronics Co., Ltd, Dongguan (CN)

(*) Notice: Subject to any disclaimer, the term of this patent is extended or adjusted under 35 U.S.C. 154(b) by 394 days.

(21) Appl. No.: 18/212,276

(22) Filed: Jun. 21, 2023

(65) Prior Publication Data

US 2024/0405464 A1 Dec. 5, 2024

(30) Foreign Application Priority Data

May 30, 2023 (CN) ........................ 202310626161.0

(51) Int. Cl.

| | |
|---|---|
| ***H01R 13/00*** | (2006.01) |
| ***H01R 13/05*** | (2006.01) |
| ***H01R 13/11*** | (2006.01) |
| ***H01R 13/18*** | (2006.01) |
| ***H01R 13/52*** | (2006.01) |
| ***H01R 24/20*** | (2011.01) |
| ***H01R 24/28*** | (2011.01) |
| *H01R 101/00* | (2006.01) |

(52) U.S. Cl.

CPC ......... *H01R 13/052* (2013.01); *H01R 13/111* (2013.01); *H01R 13/18* (2013.01); *H01R 13/5202* (2013.01); *H01R 24/20* (2013.01); *H01R 24/28* (2013.01); *H01R 2101/00* (2013.01)

(58) Field of Classification Search

CPC .. H01R 13/111; H01R 13/18; H01R 13/5202; H01R 24/20; H01R 24/28

See application file for complete search history.

(56) References Cited

U.S. PATENT DOCUMENTS

| | | | | |
|---|---|---|---|---|
| 7,108,534 B2 * | 9/2006 | Fabian | .................. | H01R 24/84 439/295 |
| 9,584,038 B2 * | 2/2017 | Linderman | ............ | H05K 1/116 |
| 11,881,672 B1 * | 1/2024 | Bassalleck | ............. | H01R 31/06 |

(Continued)

FOREIGN PATENT DOCUMENTS

| | | |
|---|---|---|
| CN | 203911041 U | 10/2014 |
| CN | 109830829 A | 5/2019 |
| CN | 211958006 U | 11/2020 |

*Primary Examiner* — Phuong Chi Thi Nguyen

(74) *Attorney, Agent, or Firm* — Birchwood IP

(57) ABSTRACT

The present disclosure provides a photovoltaic connector with good contact performance. The photovoltaic connector comprises a socket connector and a plug connector which is plugged and unplugged with the socket connector; the socket connector comprises a socket body and a female terminal provided in the socket body; the plug connector comprises a plug body and a male terminal provided in the plug body; the male terminal is inserted into the female terminal, one end of the female terminal is provided with a plurality of first through holes, and the first through holes are provided with elastic sheets. The photovoltaic connector according to the present disclosure increases the contact area and reduces the contact impedance. The photovoltaic connector has good contact performance.

18 Claims, 13 Drawing Sheets

(56) References Cited

U.S. PATENT DOCUMENTS

| | | | | |
|---|---|---|---|---|
| 2012/0312346 | A1 * | 12/2012 | Roman, Jr. | H01R 13/5808 439/271 |
| 2012/0315787 | A1 * | 12/2012 | Wiest | H02S 40/34 439/502 |
| 2016/0118933 | A1 * | 4/2016 | Russell | H02S 40/32 136/251 |
| 2024/0405464 | A1 * | 12/2024 | He | H01R 13/052 |

* cited by examiner

PHOTOVOLTAIC CONNECTOR WITH GOOD CONTACT PERFORMANCE

CROSS-REFERENCE TO RELATED APPLICATIONS

This application claims the benefit and priority of Chinese patent application No. 202310626161.0, filed on May 30, 2023, disclosure of which is hereby incorporated by reference in its entirety.

TECHNICAL FIELD

The present disclosure relates to the technical field of photovoltaic connectors, in particular to a photovoltaic connector with good contact performance.

BACKGROUND

At present, most of the male and female terminals of photovoltaic connectors have a stamping and round forming structure. A conductive internal network is assembled in a female terminal as a conductive transmission medium. When being inserted, the male terminal is in contact with the conductive internal network, and at the same time, the male terminal presses the conductive internal network. The conductive internal network is in contact with the inner wall of the female terminal, thus realizing power transmission. Medium transmission increases the unreliability of contact. For example, poor contact may lead to excessive local temperature rise, so that insulating parts of photovoltaic connectors are burned, resulting in the burning of photovoltaic connectors and power generation loss of the power station. At the same time, medium transmission increases contact impedance, which in turn increases power generation loss and reduces power output, thus affecting the overall installed capacity of the power station.

The above shortcomings are expected to be overcome by those skilled in the art.

The present disclosure aims at overcoming the above defects in the prior art, and provides a photovoltaic connector with convenient assembly, high reliability and good contact performance.

In order to solve the technical problems, the present disclosure uses the following technical scheme.

The present disclosure relates to a photovoltaic connector with good contact performance, comprising a socket connector and a plug connector which is provided opposite to and is plugged and unplugged with the socket connector; wherein the socket connector comprises a socket body, a female terminal provided inside the socket body, and a first rear cover provided at one end of the socket body far away from the plug connector; the plug connector comprises a plug body, a male terminal provided inside the plug body, and a second rear cover provided at one end of the plug body far away from the socket connector; and the male terminal is inserted into the female terminal, wherein the female terminal is provided with a plurality of first through holes at one end close to the plug connector, and elastic sheets are provided in the first through holes; an elastic contact area is formed on the inner wall of the elastic sheet, the elastic contact area is a plane convex structure; the outer surface of the female terminal is further sleeved with a first pressing member, and the first pressing member is provided with a plurality of elastic pressing members corresponding to the positions of the elastic sheets and used for squeezing the elastic sheets;

the male terminal is provided with at least one convex body at one end close to the socket connector, the convex body abuts against the inner wall of the female terminal; and the outer surface of the male terminal elastically abuts against the elastic contact area.

When the male terminal is inserted into the female terminal, the convex bodies on the male terminal abut against the inner wall of the female terminal, respectively. The outer surface of the male terminal elastically abuts against the elastic contact area of the elastic sheet, thereby increasing the contact area and reducing the contact impedance, thus increasing the contact stability and conductive reliability of the photovoltaic connector. Moreover, a first pressing member is sleeved on the outer surface of the female terminal. A plurality of elastic pressing members are provided on the first pressing member. The elastic pressing members are provided to correspond to the positions of the elastic sheets and are used for squeezing the elastic sheets. When the elastic sheets on the female terminal undergo inelastic deformation after the male terminal and the female terminal are plugged and unplugged for many times, the elastic pressing members on the first pressing member squeezes the elastic sheets, so that the structural stability of the female terminal is enhanced, and the contact performance of the photovoltaic connector is good.

Further, the female terminal comprises a first contact, a first extension and a first connecting member connected in sequence; the first contact is provided with a plurality of first through holes at one end close to the plug connector, and the elastic sheets are provided in the first through holes, so that the female terminal and the male terminal can be plugged and unplugged more reliably, and the service life is long.

Preferably, the first contact is further provided with a fixing ring at one end close to the plug connector; the cross-sectional area of the fixing ring is larger than that of the first contact, a first annular clamping groove is formed at the joint of the first contact and the fixing ring; the cross-sectional area of the first extension is larger than that of the first contact, and a second annular clamping groove is formed at the joint of the first contact and the first extension; the first pressing member is clamped on the first contact; one end of the first pressing member abuts against the first annular clamping groove, and the other end thereof abuts against the second annular clamping groove, so that the first pressing member can be stably clamped on the first contact of the female terminal, and it is also convenient to assemble the photovoltaic connector.

Preferably, the first pressing member is provided with a plurality of second through holes corresponding to the positions of the elastic sheets, two elastic pressing members which are provided oppositely are provided in the second through holes; one end of the elastic pressing member close to the inner wall of the second through hole is connected with the inner wall of the second through hole; and one end of the elastic pressing member far away from the inner wall of the second through hole is a free end.

Preferably, a plurality of first clamping members are uniformly provided on the outer surface of the first pressing member at one end far away from the plug connector; one end of the first clamping member close to the plug connector is connected with the outer surface of the first pressing member, and one end far away from the plug connector slightly expands outward, so that the female terminal can be clamped in the socket body, and it is convenient to assemble the photovoltaic connector.

Further, the male terminal comprises a second contact, a second extension and a second connecting member which are connected in sequence; the second contact is provided with at least one jack at one end close to the socket connector, an elastic member is provided in the jack; and the convex bodies are provided on one end of the elastic member close to the socket connector, respectively, so that the male terminal and the female terminal can be plugged and unplugged more reliably, and the service life is long.

Preferably, the male terminal further comprises a stop member clamped on the male terminal, the outer surface of the stop member is uniformly provided with a plurality of second clamping members; one end of the second clamping member close to the second contact is connected with the outer surface of the stop member and one end thereof far away from the second contact slightly expands outward, so that the male terminal can be clamped in the plug body, and it is convenient to assemble the photovoltaic connector.

Preferably, a third annular clamping groove is formed at the joint of the second extension of the male terminal and the second contact; a fourth annular clamping groove is formed at the joint of the second extension and the second connecting member; the stop member is clamped on the second extension; one end of the stop member abuts against the third annular clamping groove, and the other end thereof abuts against the fourth annular clamping groove, so that the stop member can be stably clamped on the second extension, and it is also convenient to assemble the photovoltaic connector.

Further, the female terminal further comprises a second pressing member sleeved outside the first pressing member; the second pressing member is provided with a plurality of inner convex members corresponding to the position of the elastic pressing member and used for squeezing the elastic pressing member. When the elastic sheets on the female terminal and the elastic pressing member on the first pressing member undergo inelastic deformation after the male terminal and the female terminal are plugged and unplugged for many times, the inner convex member on the second pressing member can squeeze the elastic pressing member and the elastic sheet, so that the structural stability of the female terminal is enhanced, and the contact performance of the photovoltaic connector is good.

Further, the plug body of the plug connector comprises a second body part and a second connecting part extending from the second body part towards the second rear cover; the second body part is provided with a first clamping hole and a second clamping hole at the position where the second body part abuts against the socket connector, respectively.

Preferably, the socket body of the socket connector comprises a first body part, a butting part extending from the middle of the first body part along the butting direction and having a hollow tubular structure, buckling anns provided on both sides of the butting part, respectively, and a first connecting part extending from the first body part towards the first back cover; and the buckling arms are elastically buckled in the first clamping hole and the second clamping hole, respectively, so that the socket connector can be stably connected with the plug connector, and the phenomenon that the photovoltaic connector is loosened during use is prevented.

Preferably, the socket connector further comprises a first waterproof sleeve, the first waterproof sleeve comprises a first mating part provided in the first connecting part and a second mating part extending from the first mating part in the direction away from the first connecting part; and the outer diameter of the first mating part is larger than that of the second mating part; the inner diameter of the first waterproof sleeve from the first mating part to the second mating part gradually decreases; the inner wall of the second mating part is provided with a plurality of first ribs at intervals; and the first rib is provided in an annular structure, so that the socket connector can be suitable for cables with various wire diameters, and the socket connector has good compatibility and strong practicability.

Preferably, a first fastener is sleeved outside the first waterproof sleeve, the first fastener comprises a first base, a plurality of first elastic parts extending from the surface of the first base in the direction away from the first connecting part, and a first inserting part extending from the surface of the first base in the direction close to the first connecting part, the outer diameter of the first inserting part is smaller than that of the first base; and the first inserting part abuts against the first mating part of the first waterproof sleeve.

Preferably, the first connecting part is provided with a plurality of first serrated protrusions at one end edge far away from the first body part; the first base is provided with a plurality of second serrated protrusions at one end edge close to the first connecting part; and the first fastener is engaged with the first connecting part.

Preferably, the socket body further comprises an installation part provided at one end of the butting part close to the first body part, an annular waterproof ring is sleeved on the installation part, and the annular waterproof ring has a double-peak structure, so that the photovoltaic connector has good waterproof performance.

Preferably, the plug connector further comprises a second waterproof sleeve, the second waterproof sleeve comprises a third mating part provided in the second connecting part and a fourth mating part extending from the third mating part in the direction away from the second connecting part; the outer diameter of the third mating part is larger than that of the fourth mating part; the inner diameter of the second waterproof sleeve from the third mating part to the fourth mating part gradually decreases; the inner wall of the fourth mating part is provided with a plurality of second ribs at intervals; and the second rib is provided in an annular structure, so that the socket connector can be suitable for cables with various wire diameters, and the socket connector has good compatibility and strong practicability.

Preferably, a second fastener is sleeved outside the second waterproof sleeve, the second fastener comprises a second base, a plurality of second elastic parts extending from the surface of the second base in the direction away from the second connecting part, and a second inserting part extending from the surface of the second base in the direction close to the second connecting part, the outer diameter of the second inserting part is larger than that of the second base; and the second inserting part abuts against the third matching part of the second waterproof sleeve.

Preferably, the second connecting part is provided with a plurality of third serrated protrusions at one end edge far away from the second body part; the second base is provided with a plurality of fourth serrated protrusions at one end edge close to the second connecting part; and the second fastener is engaged with the second connecting part.

Compared with the prior art, the present disclosure has the following beneficial effects.

1. The present disclosure provides a photovoltaic connector with good contact performance. The female terminal is provided with a plurality of first through holes at one end close to the plug connector. Elastic sheets are provided in the first through holes. An elastic contact area is formed on the inner wall of the elastic sheet. The elastic contact area is a plane convex structure. At the same time, at least one convex body is provided at one end of the male terminal close to the socket connector, so that when the male terminal is inserted into the female terminal, the convex body on the male terminal abuts against the inner wall of the female terminal, respectively, and the outer surface of the male terminal elastically abuts against the elastic contact area of the elastic sheet, thereby increasing the contact area and reducing the contact impedance, thus increasing the contact stability and conductive reliability of the photovoltaic connector, and reducing the risk that the photovoltaic connector generates high temperature to affect the operation or even burn when a large current passes.

2. A first pressing member is sleeved on the outer surface of the female terminal. A plurality of elastic pressing members are provided on the first pressing member. The elastic pressing members are provided to correspond to the positions of the elastic sheets and are used for squeezing the elastic sheets, so that when the elastic sheets on the female terminal undergo inelastic deformation after the male terminal and the female terminal are plugged and unplugged for many times, the elastic pressing members on the first pressing member can squeeze the elastic sheets, thereby enhancing the structural stability of the female terminal.

3. A second pressing member is sleeved outside the first pressing member, a plurality of inner convex members are provided on the second pressing member, and the inner convex members are provided to correspond to the position of the elastic pressing member and used for squeezing the elastic pressing member. When the elastic sheets on the female terminal and the elastic pressing member on the first pressing member undergo inelastic deformation after the male terminal and the female terminal are plugged and unplugged for many times, the inner convex member on the second pressing member can squeeze the elastic pressing member and the elastic sheet, so that the structural stability of the female terminal is enhanced, the contact performance of the photovoltaic connector is good, and the service life of the photovoltaic connector is prolonged.

4. Buckling arms are provided on both sides of the butting part of the socket connector, respectively. A first clamping hole and a second clamping hole are formed at the position where the second body part of the plug connector abuts against the socket connector, respectively. The buckling arms of the socket connector are provided to be elastically buckled in the first clamping hole and the second clamping hole, respectively, so that the socket connector can be stably connected with the plug connector, the phenomenon that the photovoltaic connector is loosened during use is prevented, and it is conducive to improving the contact stability of the photovoltaic connector. At the same time, it is also convenient for workers to quickly install, disassemble and repair the photovoltaic connector.

5. The inner diameter of the first waterproof sleeve gradually decreases from the first mating part to the second mating part, and a plurality of first ribs are provided on the inner wall of the second mating part at intervals; the inner diameter of the second waterproof sleeve gradually decreases from the third mating part to the fourth mating part, and a plurality of second ribs are provided on the inner wall of the fourth mating part at intervals, so that the socket connector and the plug connector can be suitable for cables with various wire diameters, and the photovoltaic connector has good compatibility and strong practicability.

DESCRIPTION OF REFERENCE NUMERALS

1. Socket connector; 11. Socket body; 111. First body part; 1112. First anti-slip groove; 112. Butting part; 113. Buckling arm; 114. First connecting part; 1141. First external thread; 1142. First serrated protrusion; 115. Installation part; 12. Female terminal; 121. First contact; 1211. Fixing ring; 1212. First through hole; 1213. Elastic sheet; 122. First extension; 123. First connecting member; 124. First annular clamping groove; 125. Second annular clamping groove; 126. First pressing member; 1261. Second through hole; 1262. Elastic pressing member; 1263. First clamping member; 127, Second pressing member; 1271. Inner convex member; 13. First rear cover; 131. First internal thread; 14. First fastener; 141. First base; 1411. Second serrated protrusion; 142. First elastic part; 143. First inserting part; 15. First waterproof sleeve; 151. First mating part; 152. Second mating part; 1521. First rib; 16. Annular waterproof ring; 2. Plug connector; 21. Plug body; 211. Second body part; 2112. Second anti-slip groove; 2113. First clamping hole; 2114. Second clamping hole; 212. Second connecting part; 2121. Second external thread; 2122. Third serrated protrusion; 22. Male terminal; 221. Second contact; 2211. Jack; 2212. Elastic member; 2213. Convex body; 222. Second extension; 223. Second connecting member; 224. Third annular clamping groove; 225. Fourth annular clamping groove; 226. Stop part; 2261. Second clamping member; 23. Second rear cover; 231. Second internal thread; 24. Second fastener; 241. Second base; 2412. Fourth serrated protrusion; 242. Second elastic part; 243. Second inserting part; 25. Second waterproof sleeve; 251. Third mating part; 252. Fourth mating part; 2521. Second rib.

DETAILED DESCRIPTION

In order to make the object, the technical scheme and the advantages of the embodiment of the present disclosure more clear, the technical scheme in the embodiment of the present disclosure will be described clearly and completely hereinafter with reference to the attached drawings. Obviously, the described embodiment is a part of the embodiments of the present disclosure, rather than all of the embodiments. Based on the embodiments in the present disclosure, all other embodiments obtained by those skilled in the art without any creative effort belong to the scope of protection of the present disclosure.

Figure 1:
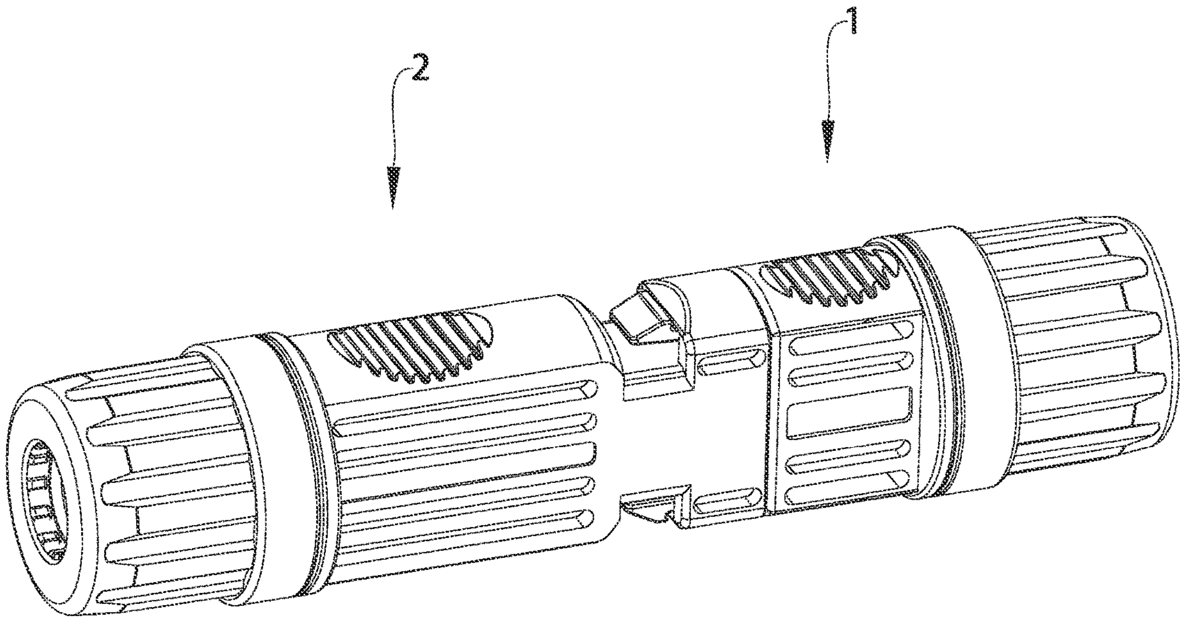
FIG. 1 is a schematic diagram of the overall structure of a photovoltaic connector with good contact performance according to a first embodiment of the present disclosure.
Figure 2:
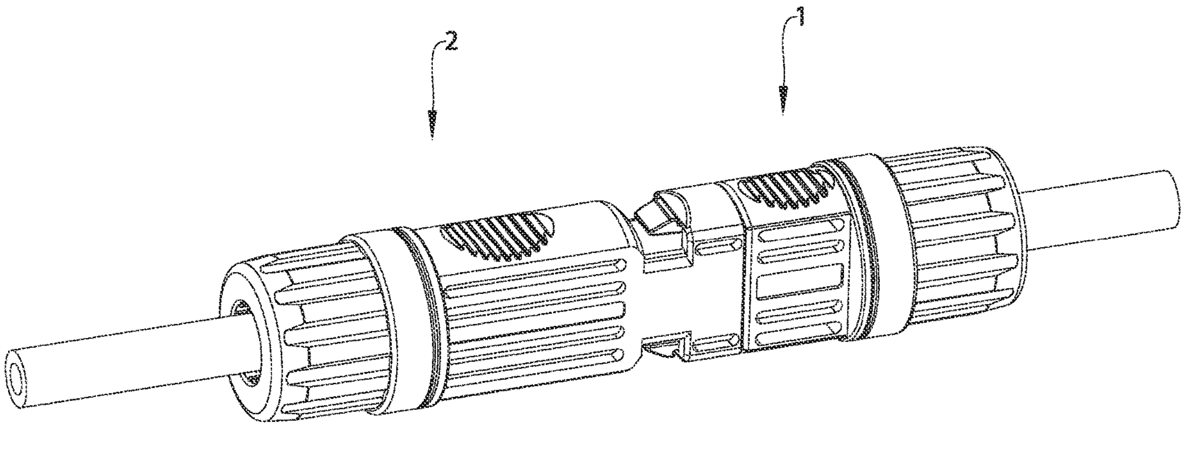
FIG. 2 is a schematic diagram of a photovoltaic connector with good contact performance according to a first embodiment of the present disclosure when a cable is inserted.
Figure 3:
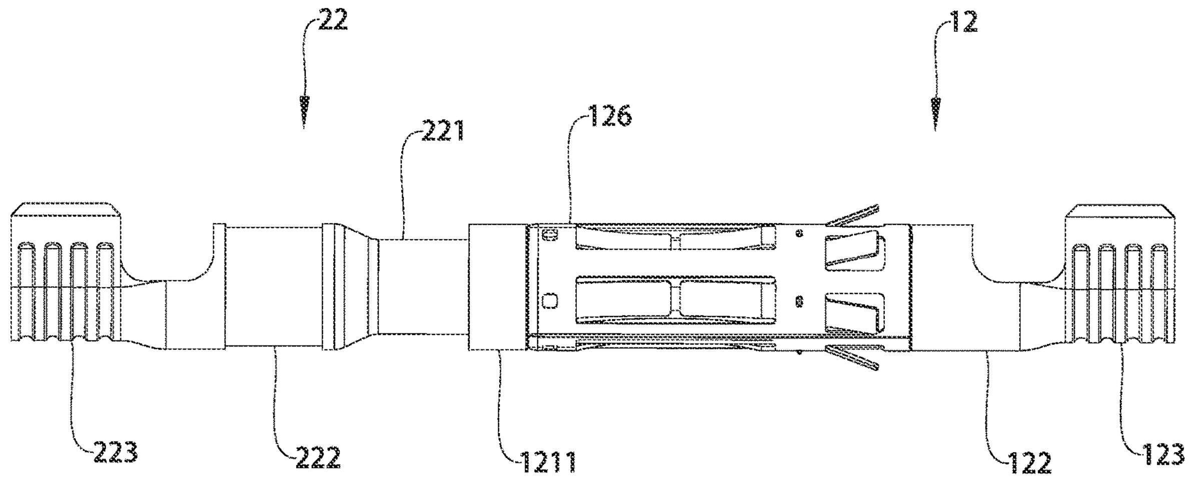
FIG. 3 is a schematic structural diagram of a male terminal inserted into a female terminal in a photovoltaic connector with good contact performance according to a first embodiment of the present disclosure.
Figure 4:
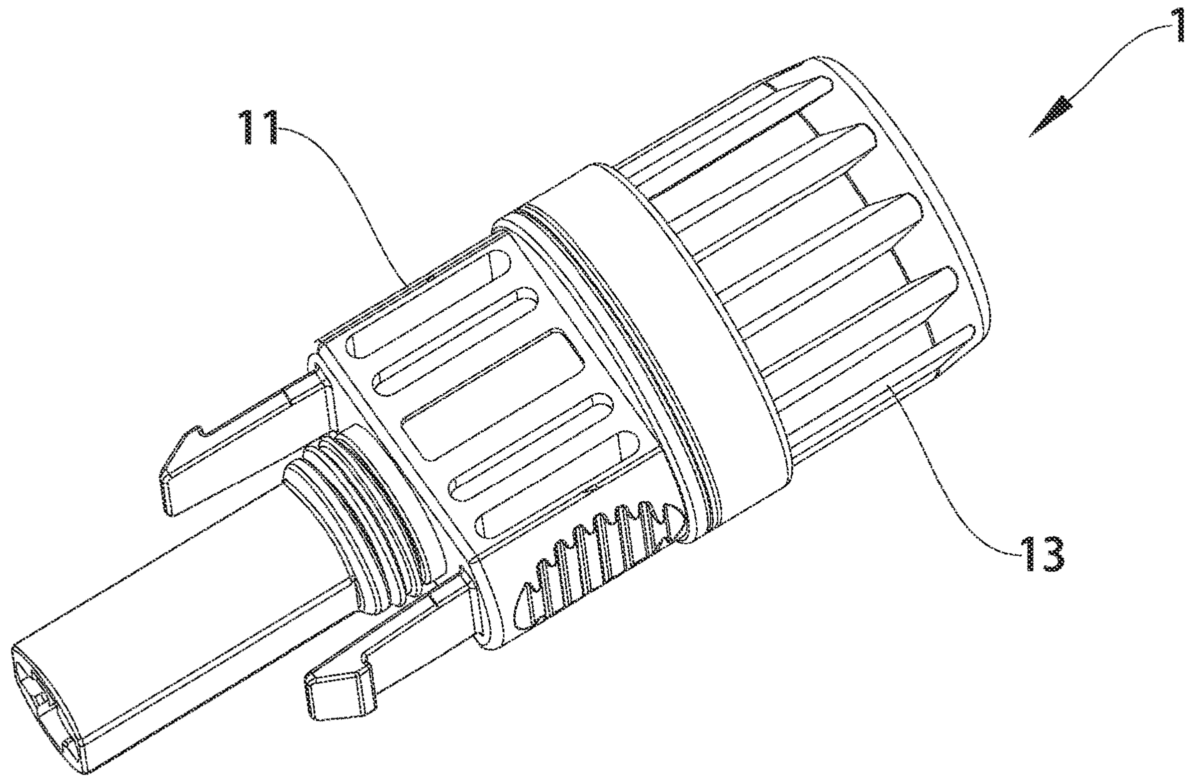
FIG. 4 is a schematic structural diagram of a socket connector in a photovoltaic connector with good contact performance according to a first embodiment of the present disclosure.
Figure 5:
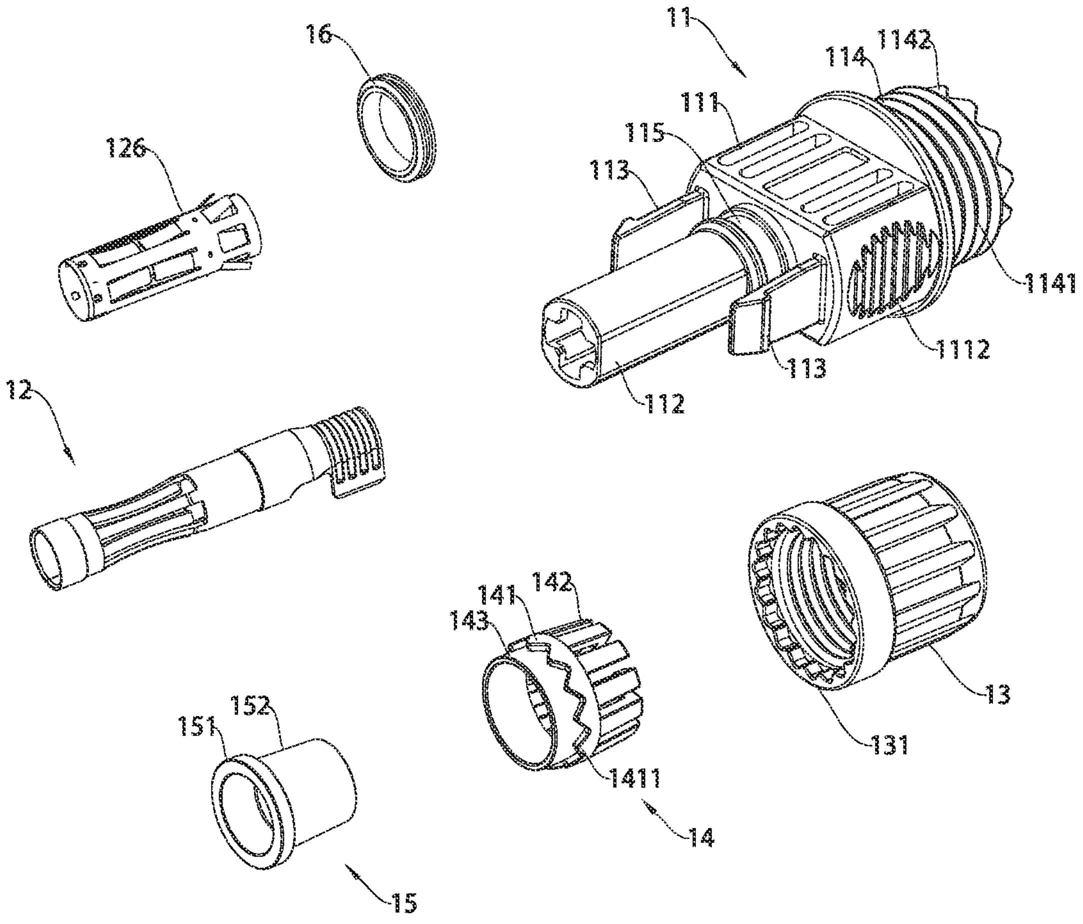
FIG. 5 is an exploded schematic diagram of a socket connector in a photovoltaic connector with good contact performance according to a first embodiment of the present disclosure.
Figure 6:
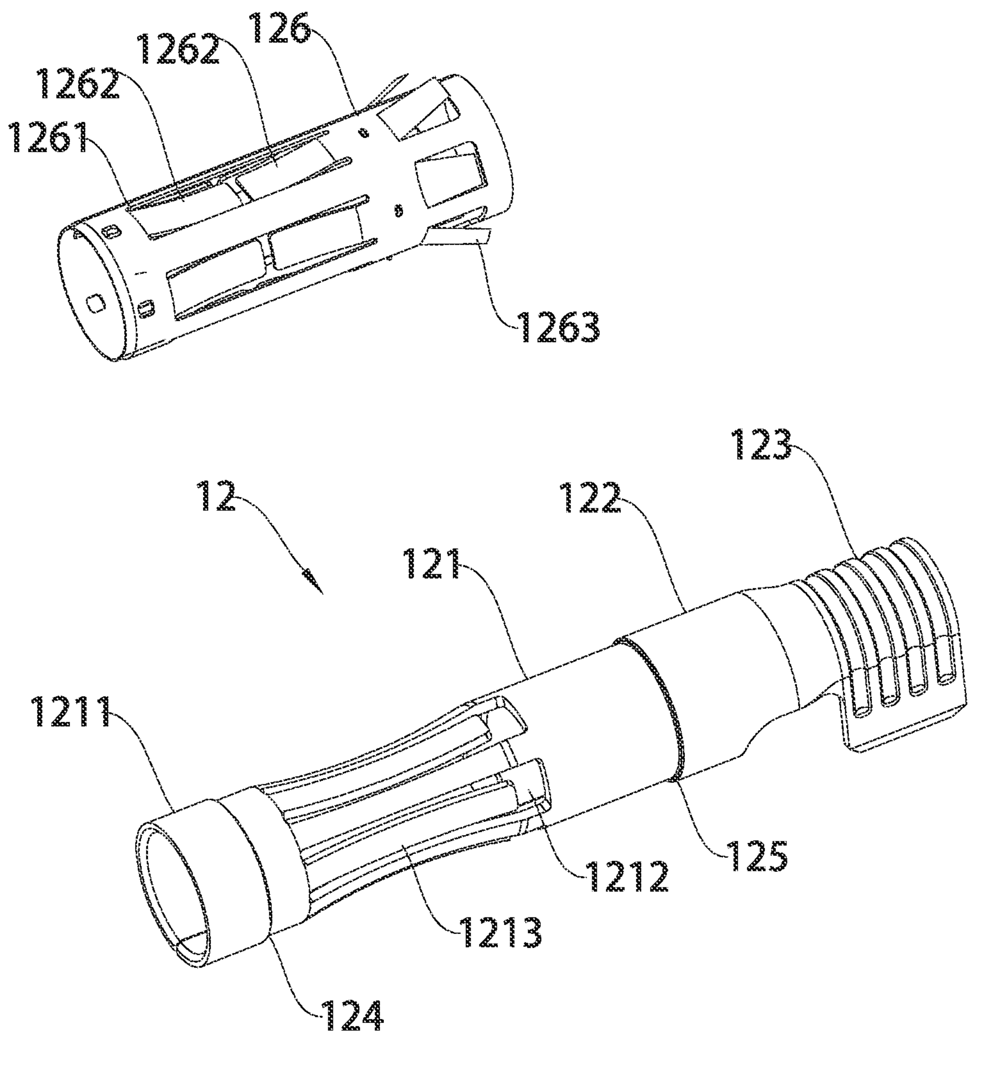
FIG. 6 is an exploded schematic diagram of a female terminal in a photovoltaic connector with good contact performance according to a first embodiment of the present disclosure.
Figure 7:
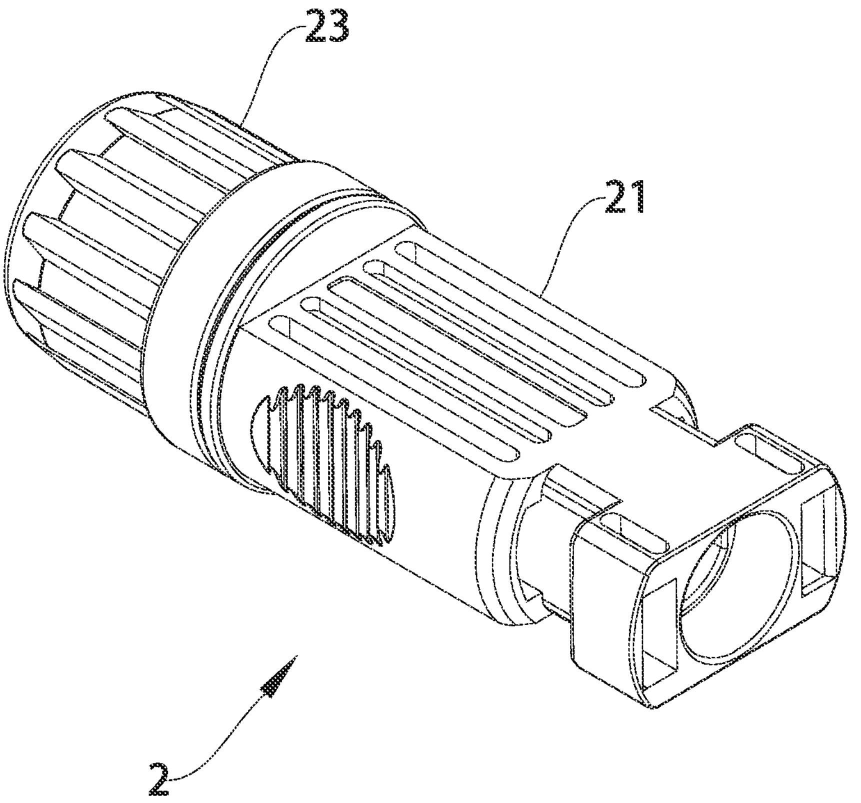
FIG. 7 is a schematic structural diagram of a plug connector in a photovoltaic connector with good contact performance according to a first embodiment of the present disclosure.
Figure 8:
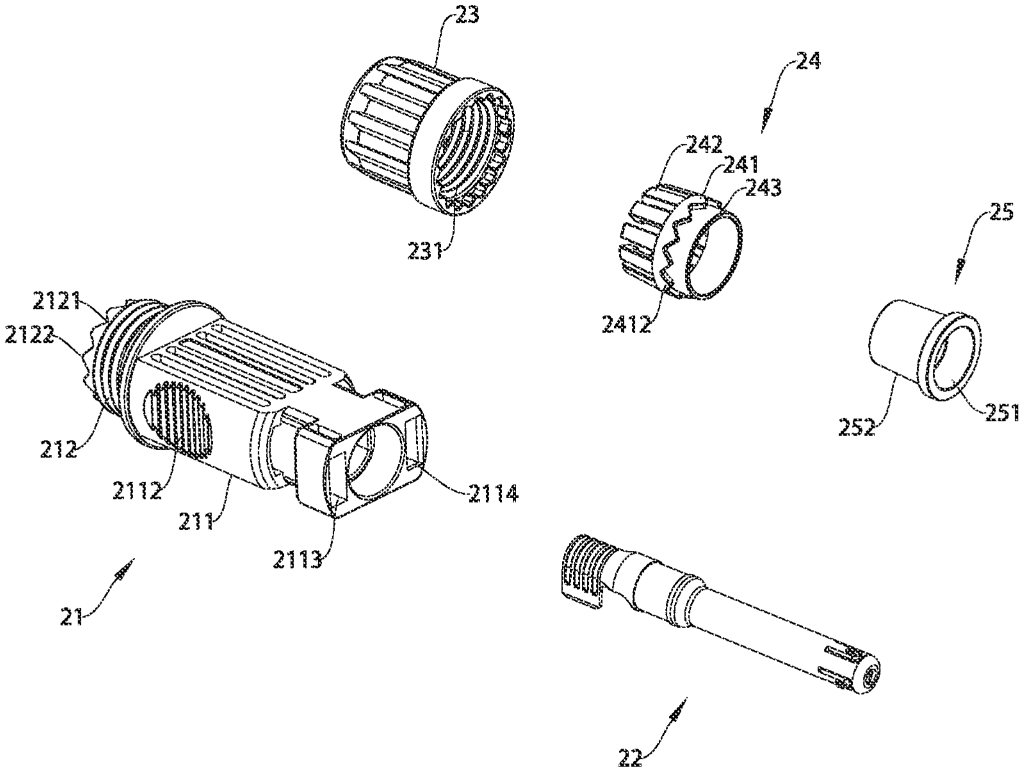
FIG. 8 is an exploded schematic diagram of a plug connector in a photovoltaic connector with good contact performance according to a first embodiment of the present disclosure.
Figure 9:
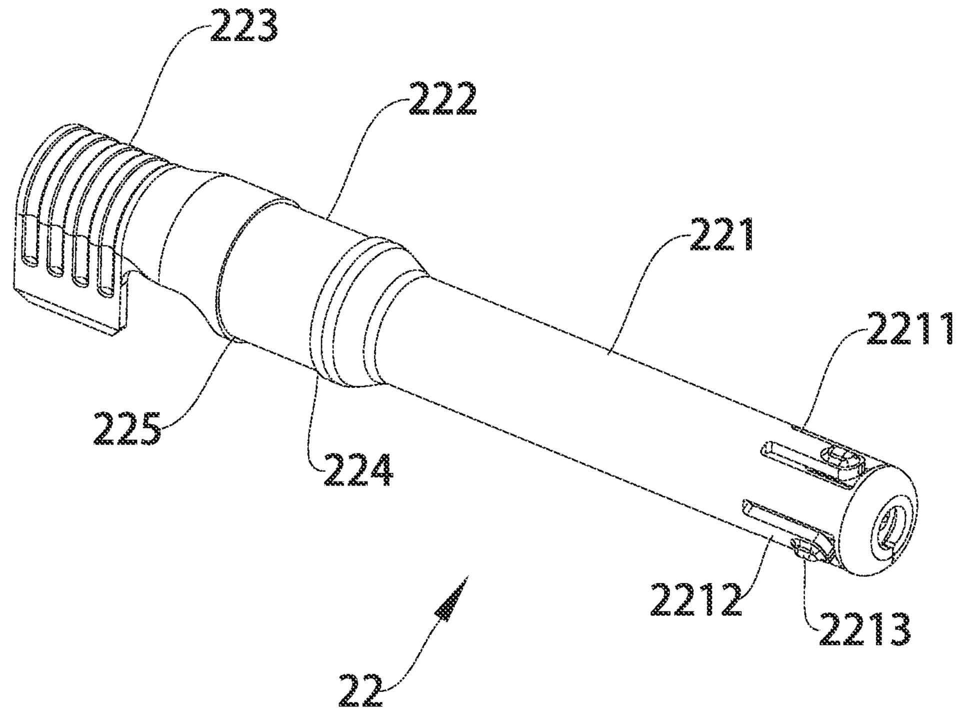
FIG. 9 is a schematic structural diagram of a male terminal in a photovoltaic connector with good contact performance according to a first embodiment of the present disclosure.

As shown in FIG. 1 to FIG. 2, a photovoltaic connector with good contact performance according to a first embodiment of the present disclosure is shown. A photovoltaic connector with good contact performance comprises a socket connector 1 and a plug connector 2; the socket connector 1 is provided opposite to the plug connector 2, and the socket connector 1 is plugged and unplugged with the plug connector 2.

As shown in FIGS. 3 to 6, the socket connector 1 comprises a socket body 11, a female terminal 12, a first rear cover 13, a first fastener 14, a first waterproof sleeve 15 and an annular waterproof ring 16. The female terminal 12 is provided inside the socket body 11; the first rear cover 13 is provided at one end of the socket body 11 far away from the plug connector 2. The first rear cover 13 is provided with a first cover hole through which cables pass.

The socket body 11 comprises a first body part 111, a butting part 112, two buckling arms 113, a first connecting part 114 and an installation part 115. First anti-slip grooves 1112 are formed on both sides of the first body part 111, which is convenient for workers to hold and install. The butting part 112 extends from the middle of the first body part 111 in the butting direction, and the butting part 112 is provided in a hollow tubular structure. Specifically, the cross-sectional shape of the inner cavity of the butting part 112 is cross-shaped to prevent the female terminal 12 from being separated from the socket body 11 from the opening of the butting part 112 when the socket connector 1 is plugged and unplugged with the plug connector 2. The buckling arms 113 are provided at both sides of the butting part 112, respectively. The first connecting part 114 extends from the first body part 111 toward the first rear cover 13. The outer surface of the first connecting part 114 is provided with a continuous first external thread 1141. The inner wall of the first rear cover 13 is correspondingly provided with a continuous first internal thread 131. The first rear cover 13 is in threaded connection with the first connecting part 114. Meanwhile, the first connecting part 114 is provided with a plurality of first serrated protrusions 1142 at one end edge far away from the first body part 111. The installation part 115 is provided at one end of the butting part 112 close to the first body part 111, and an annular waterproof ring 16 is sleeved on the installation part 115. Preferably, the annular waterproof ring 16 has a double-peak structure.

The female terminal 12 comprises a first contact 121, a first extension 122 and a first connecting member 123. The first contact 121, the first extension 122 and the first connecting member 123 are connected in sequence. The first extension 122 is provided between the first contact 121 and the first connecting member 123. The first contact 121 is located in the butting part 112. The female terminal 12 has an integrated structure, that is, the first contact 121, the first extension 122 and the first connecting member 123 are integrally formed, thus reducing the parts of the female terminal 12 and facilitating the assembly of workers.

The first contact 121 is provided with a plurality of first through holes 1212 at one end close to the plug connector 2. The elastic sheets 1213 are provided in the first through holes 1212. An elastic contact area is formed on the inner wall of the elastic sheet 1213. The elastic contact area is a plane convex structure. The first contact 121 is further provided with a fixing ring 1211 at one end close to the plug connector 2. The cross-sectional area of the fixing ring 1211 is larger than that of the first contact 121. A first annular clamping groove 124 is formed at the joint of the first contact 121 and the fixing ring 1211. The cross-sectional area of the first extension 122 is larger than that of the first contact 121. A second annular clamping groove 125 is formed at the joint of the first contact 121 and the first extension 122.

The female terminal 12 further comprises a first pressing member 126 sleeved on its outer surface. In this embodiment, one end of the first pressing member 126 abuts against the first annular clamping groove 124, and the other end thereof abuts against the second annular clamping groove 125, so that the first pressing member 126 is clamped on the first contact 121. The first pressing member 126 is provided with a plurality of second through holes 1261. The second through holes 1261 correspond to the positions of the elastic sheets 1213. In this embodiment, two elastic pressing members 1262 which are provided oppositely are provided in the second through holes 1261. The elastic pressing members 1262 correspond to the positions of the elastic sheets 1213 for squeezing the elastic sheets 1213. Specifically, one end of the elastic pressing member 1262 close to the inner wall of the second through hole 1261 is connected with the inner wall of the second through hole 1261, One end of the elastic pressing member 1262 far away from the inner wall of the second through hole 1261 is a free end. In other embodiments, the second through hole 1261 can be further provided with an elastic pressing member, which is not limited thereto.

A plurality of first clamping members 1263 are uniformly provided on the outer surface of the first pressing member 126 at one end far away from the plug connector 2. One end of the first clamping member 1263 close to the plug connector 2 is connected with the outer surface of the first pressing member 126, and one end far away from the plug connector 2 slightly expands outward, so that the female terminal 12 can be clamped in the socket body 11, which is convenient for workers to install.

Figure 10:
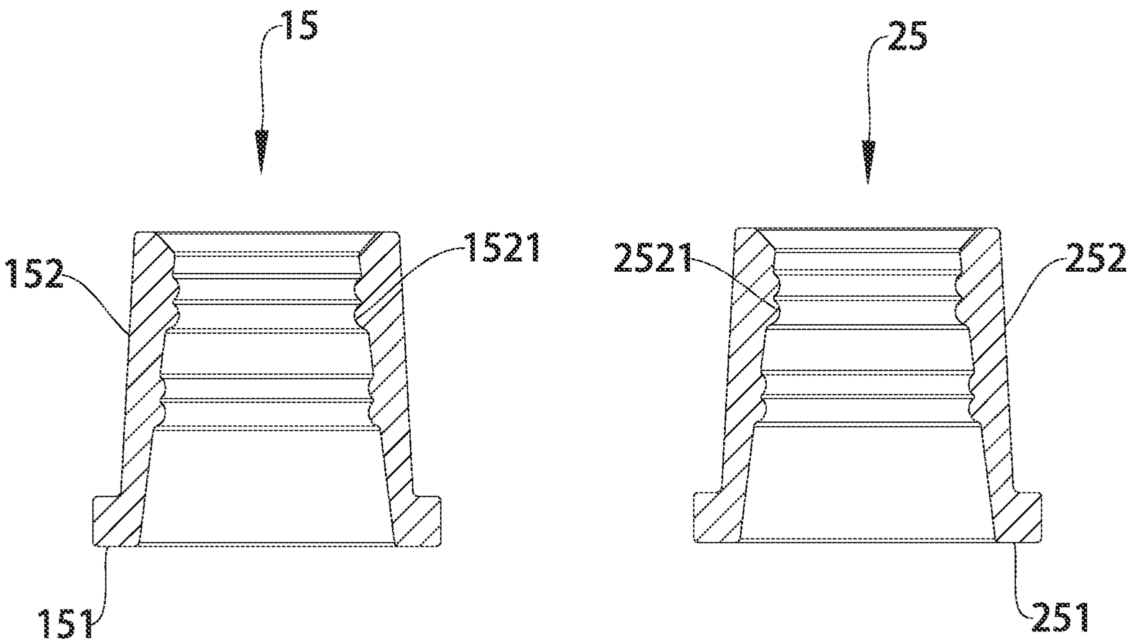
FIG. 10 is a sectional view of a first waterproof sleeve and a second waterproof sleeve in a photovoltaic connector with good contact performance according to a first embodiment of the present disclosure.

As shown in FIG. 10 together, the first waterproof sleeve 15 comprises a first mating part 151 and a second mating part 152, The second mating part 152 extends from the first mating part 151 in the direction away from the first connecting part 114. The first mating part 151 is provided in the first connecting part 114. Specifically, the outer diameter of the first mating part 151 is larger than that of the second mating part 152. The inner diameter of the first waterproof sleeve 15 from the first mating part 151 to the second mating part 152 gradually decreases. The inner wall of the second mating part 152 is further provided with a plurality of first ribs 1521 at intervals. The first rib 1521 is provided in an annular structure, so that the socket connector 1 can be suitable for cables with various wire diameters, and the photovoltaic connector has good compatibility and strong practicability. In this embodiment, four first ribs 1521 are provided on the inner wall of the second mating part 152 at intervals. In other embodiments, two first ribs 1521 or three first ribs 1521 can be provided on the inner wall of the second mating part 152 at intervals, which is not limited thereto.

The first fastener 14 is sleeved outside the first waterproof sleeve 15. The first fastener 14 comprises a first base 141, a plurality of first elastic parts 142 and a first insertion part 143. The first base 141 is provided with a plurality of second serrations 1411 at one end edge close to the first connecting part 114, and the first fastener 14 is engaged with the first connecting part 114. The first elastic part 142 extends from the surface of the first base 141 in the direction away from the first connecting part 114. The first insertion part 143 extends from the surface of the first base 141 in the direction close to the first connection part 114, and the first insertion part 143 abuts against the first mating part 151 of the first waterproof sleeve 15. Specifically, the outer diameter of the first insertion part 143 is smaller than that of the first base 141.

As shown in FIGS. 3, 7 to 10, the plug connector 2 comprises a plug body 21, a male terminal 22, a second rear cover 23, a second fastener 24 and a second waterproof sleeve 25. The male terminal 22 is provided inside the plug body 21. The second rear cover 23 is provided at one end of the plug body 21 far away from the socket connector 1. The second rear cover 23 is provided with a second cover hole through which cables pass.

The plug body 21 comprises a second body part 211 and a second connecting part 212. The second connecting part 212 extends from the second body part 211 toward the second rear cover 23. The second body part 211 is provided with a first clamping hole 2113 and a second clamping hole 2114 at the position where the second body part abuts against the socket connector 1, respectively. The buckling arm 113 on the socket connector 1 is elastically buckled in the first clamping hole 2113 and the second clamping hole 2114, respectively, so that the socket connector 1 can be stably connected with the plug connector 2. The phenomenon that the photovoltaic connector is loosened during use is prevented, and it is also convenient for workers to install, disassemble and repair the photovoltaic connector. Second anti-slip grooves 2112 are formed on the surfaces of both sides of the second body part 211, which is convenient for workers to hold and install. The outer surface of the second connecting part 212 is provided with a continuous second external thread 2121. The inner wall of the second rear cover 23 is correspondingly provided with a continuous second internal thread 231. The second rear cover 23 is in threaded connection with the second connecting part 212. At the same time, the second connecting part 212 is further provided with a plurality of third serrated protrusions 2122 at one side edge far away from the second main part 211.

The male terminal 22 comprises a second contact 221, a second extension 222 and a second connecting member 223. The second contact 221, the second extension 222 and the second connecting member 223 are connected in sequence. The second extension 222 is provided between the second contact 221 and the second connecting member 223. A third annular clamping groove 224 is formed at the joint of the second extension 222 and the second contact 221. A fourth annular clamping groove 225 is formed at the joint of the second extension 222 and the second connecting member 223.

The second contact 221 is provided with at least one jack 2211 at one end close to the socket connector 1, an elastic member 2212 is provided in the jack 2211; and the convex bodies 2213 are provided on one end of the elastic member 2212 close to the socket connector 1. In this embodiment, the convex body 2213 is a convex hull. In other embodiments, the convex body 2213 can also be provided as a lug, which is not limited thereto. The male terminal 22 is inserted into the female terminal 12, and the female terminal 12 has an integrated conductive structure, which is beneficial to the reliable electrical connection between the male terminal 22 and the female terminal 12. The convex body 2213 on the male terminal 22 abuts against the inner wall of the female terminal 12. The outer surface of the male terminal 22 elastically abuts against the elastic contact area of the female terminal 12. Specifically, the outer surface of the second contact 221 elastically abuts against the elastic contact area of the female terminal 12.

The second waterproof sleeve 25 comprises a third mating part 251 and a fourth mating part 252. The fourth mating part 252 extends from the third mating part 251 in the direction away from the second connecting part 212. The third mating part 251 is provided in the second connecting part 212. Specifically, the outer diameter of the third mating part 251 is larger than that of the fourth mating part 252. The inner diameter of the second waterproof sleeve 25 from the third mating part 251 to the fourth mating part 252 gradually decreases. The inner wall of the fourth mating part 252 is provided with a plurality of second ribs 2521 at intervals. The second rib 2521 is provided in an annular structure, so that the plug connector 2 can be suitable for cables with various wire diameters, and the photovoltaic connector has good compatibility and strong practicability. In this embodiment, the inner wall of the fourth mating part 252 is provided with four second ribs 2521 at intervals. In other embodiments, the inner wall of the fourth mating part 252 can be provided with two second ribs 2521 or three second ribs 2521 at intervals, which is not limited thereto.

The second fastener 24 is sleeved outside the second waterproof sleeve 25. The second fastener 24 comprises a second base 241, a plurality of second elastic parts 242 and a second insertion part 243. The second base 241 is provided with a plurality of fourth serrations 2412 at one end edge close to the second connecting part 212, and the second fastener 24 is engaged with the second connecting part 212. The second elastic part 242 extends from the surface of the second base 241 in the direction away from the second connecting part 212. The second insertion part 243 extends from the surface of the second base 241 in the direction close to the second connection part 212, and the second insertion part 243 abuts against the third mating part 251 of the second waterproof sleeve 25. Specifically, the outer diameter of the second insertion part 243 is smaller than that of the second base 241.

When in use, the plug connector 2 is provided opposite to and is plugged and unplugged with the socket connector 1, and the male terminal 22 in the plug connector 2 is inserted into the female terminal 12 in the socket connector 1. The convex body 2213 on the male terminal 22 abuts against the inner wall of the female terminal 12. The outer surface of the second contact 221 of the male terminal 22 elastically abuts against the elastic contact area of the female terminal 12, which increases the contact area, reduces the contact impedance, increases the contact stability and conductive reliability of the photovoltaic connector, and reduces the risk that the photovoltaic connector generates high temperature to affect the operation or even burn when a large current passes. When the elastic sheets 1213 on the female terminal 12 undergo inelastic deformation after the male terminal 22 and the female terminal 12 are plugged and unplugged for many times, the elastic pressing members 1262 on the first pressing member 126 can squeeze the elastic sheets 1213, thereby enhancing the structural stability of the female terminal 12, enabling the photovoltaic connector to have good contact performance, and prolonging the service life of the photovoltaic connector.

Figure 11:
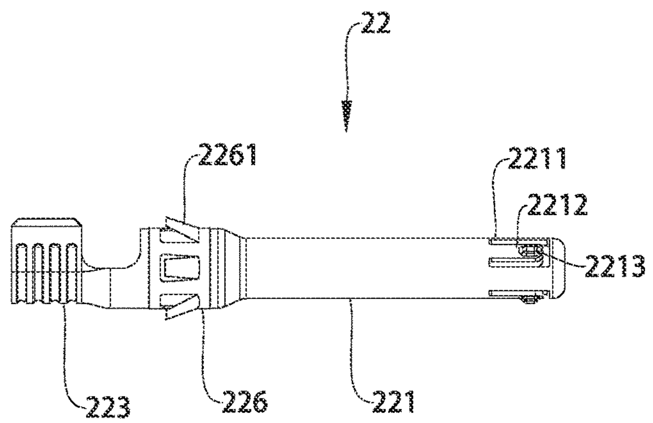
FIG. 11 is a schematic structural diagram of a male terminal and a female terminal in a photovoltaic connector with good contact performance according to a second embodiment of the present disclosure.

As shown in FIG. 11, FIG. 11 is a schematic structural diagram of the male terminal 22 and the female terminal 12 in a photovoltaic connector with good contact performance according to a second embodiment of the present disclosure. In this embodiment, the structure of the female terminal 12 is the same as that of the female terminal 12 in the first embodiment. The difference is that the male terminal 22 further comprises a stop member 226 clamped on the male terminal 22. Specifically, one end of the stop member 226 abuts against the third annular clamping groove 224, and the other end thereof abuts against the fourth annular clamping groove 225. The outer surface of the stop member 226 is uniformly provided with a plurality of second clamping members 2261. One end of the second clamping member 2261 close to the second contact 221 is connected with the outer surface of the stop member 226 and one end thereof far away from the second contact 221 slightly expands outward, so that the male terminal 22 can be clamped in the plug body 21, which is convenient to assemble the photovoltaic connector.

Figure 12:
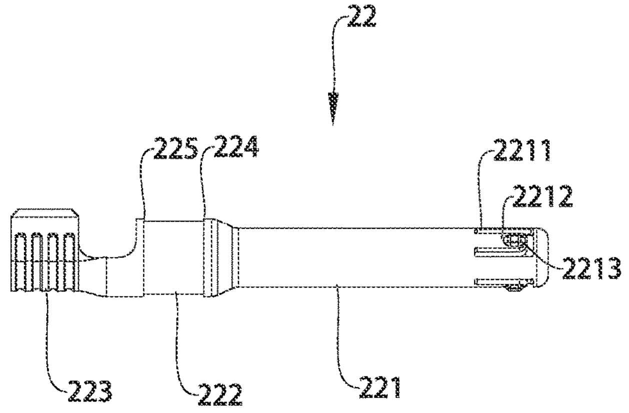
FIG. 12 is a schematic structural diagram of a male terminal and a female terminal in a photovoltaic connector with good contact performance according to a third embodiment of the present disclosure.

As shown in FIG. 12, FIG. 12 is a schematic structural diagram of the male terminal 22 and the female terminal 12 in a photovoltaic connector with good contact performance according to a third embodiment of the present disclosure. In this embodiment, the structure of the male terminal 22 is the same as that of the male terminal 22 in the first embodiment. The difference is that the female terminal 12 further comprises a second pressing member 127. The second pressing member 127 is sleeved outside the first pressing member 126. The second pressing member 127 is provided with a plurality of inner convex members 1271. The inner convex members 1271 correspond to the position of the elastic pressing member 1262 and are used for squeezing the elastic pressing member 1262. When the elastic sheets 1213 on the female terminal 12 and the elastic pressing member 1262 on the first pressing member 126 undergo inelastic deformation after the male terminal 22 and the female terminal 12 are plugged and unplugged for many times, the inner convex member 1271 on the second pressing member 127 can squeeze the elastic pressing member 1262 and the elastic sheet 1213, so that the structural stability of the female terminal 12 is further enhanced, and the photovoltaic connector has good contact performance.

Figure 13:
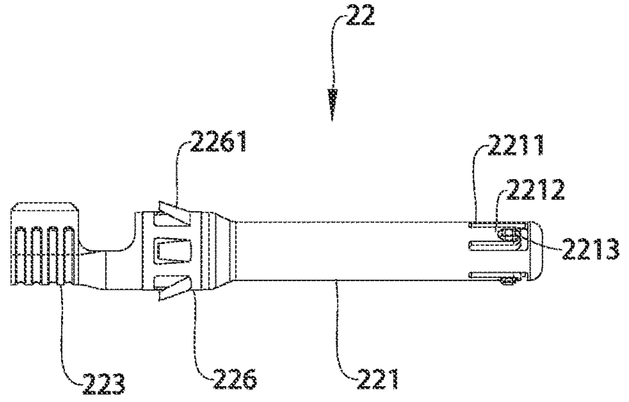
FIG. 13 is a schematic structural diagram of a male terminal and a female terminal in a photovoltaic connector with good contact performance according to a fourth embodiment of the present disclosure.

As shown in FIG. 13. FIG. 13 is a schematic structural diagram of the male terminal 22 and the female terminal 12 in a photovoltaic connector with good contact performance according to a fourth embodiment of the present disclosure. In this embodiment, the male terminal 22 further comprises a stop member 226 clamped on the male terminal 22. Specifically, one end of the stop member 226 abuts against the third annular clamping groove 224, and the other end thereof abuts against the fourth annular clamping groove 225. The outer surface of the stop member 226 is uniformly provided with a plurality of second clamping members 2261. One end of the second clamping member 2261 close to the second contact 221 is connected with the outer surface of the stop member 226, and one end thereof far away from the second contact 221 slightly expands outward.

The female terminal 12 further comprises a second pressing member 127. The second pressing member 127 is sleeved outside the first pressing member 126. The second pressing member 127 is provided with a plurality of inner convex members 1271. The inner convex members 1271 correspond to the position of the elastic pressing member 1262 and are used for squeezing the elastic pressing member 1262. When the elastic sheets 1213 on the female terminal 12 and the elastic pressing member 1262 on the first pressing member 126 undergo inelastic deformation after the male terminal 22 and the female terminal 12 are plugged and unplugged for many times, the inner convex member 1271 on the second pressing member 127 can squeeze the elastic pressing member 1262 and the elastic sheet 1213.

The above-mentioned embodiment is the preferred embodiment of the present disclosure, but the embodiment of the present disclosure is not limited by the above-mentioned embodiment. Any other changes, modifications, substitutions, combinations and simplifications made without departing from the spirit and principle of the present disclosure shall be equivalent replacements, which are all included in the scope of protection of the present disclosure.

What is claimed is:

1. A photovoltaic connector with good contact performance, comprising a socket connector (1) and a plug connector (2) which is provided opposite to and is plugged and unplugged with the socket connector (1); wherein the socket connector (1) comprises a socket body (11), a female terminal (12) provided inside the socket body (11), and a first rear cover (13) provided at one end of the socket body (11) far away from the plug connector (2); the plug connector (2) comprises a plug body (21), a male terminal (22) provided inside the plug body (21), and a second rear cover (23) provided at one end of the plug body (21) far away from the socket connector (1); and the male terminal (22) is inserted into the female terminal (12), wherein the female terminal (12) is provided with a plurality of first through holes (1212) at one end close to the plug connector (2), and elastic sheets (1213) are provided in the first through holes (1212); an elastic contact area is formed on the inner wall of the elastic sheet (1213), the elastic contact area is a plane convex structure; the outer surface of the female terminal (12) is further sleeved with a first pressing member (126), and the first pressing member (126) is provided with a plurality of elastic pressing members (1262) corresponding to the positions of the elastic sheets (1213) and used for squeezing the elastic sheets (1213);

the male terminal (22) is provided with at least one convex body (2213) at one end close to the socket connector (1), the convex body (2213) abuts against the inner wall of the female terminal (12); and the outer surface of the male terminal (22) elastically abuts against the elastic contact area.

2. The photovoltaic connector with good contact performance according to claim 1, wherein the female terminal (12) further comprises a second pressing member (127) sleeved outside the first pressing member (126); the second pressing member (127) is provided with a plurality of inner convex members (1271) corresponding to the position of the elastic pressing member (1262) and used for squeezing the elastic pressing member (1262).

3. The photovoltaic connector with good contact performance according to claim 1, wherein the female terminal (12) comprises a first contact (121), a first extension (122) and a first connecting member (123) connected in sequence; the first contact (121) is provided with a plurality of first through holes (1212) at one end close to the plug connector (2), and the elastic sheets (1213) are provided in the first through holes (1212).

4. The photovoltaic connector with good contact performance according to claim 3, wherein the first contact (121) is further provided with a fixing ring (1211) at one end close to the plug connector (2); the cross-sectional area of the fixing ring (1211) is larger than that of the first contact (121), a first annular clamping groove (124) is formed at the joint of the first contact (121) and the fixing ring (1211); the cross-sectional area of the first extension (122) is larger than that of the first contact (121), and a second annular clamping groove (125) is formed at the joint of the first contact (121) and the first extension (122);

the first pressing member (126) is clamped on the first contact (121); one end of the first pressing member (126) abuts against the first annular clamping groove (124), and the other end thereof abuts against the second annular clamping groove (125).

5. The photovoltaic connector with good contact performance according to claim 4, wherein the first pressing member (126) is provided with a plurality of second through holes (1261) corresponding to the positions of the elastic sheets (1213), two elastic pressing members (1262) which are provided oppositely are provided in the second through holes (1261); one end of the elastic pressing member (1262) close to the inner wall of the second through hole (1261) is connected with the inner wall of the second through hole (1261); and one end of the elastic pressing member (1262) far away from the inner wall of the second through hole (1261) is a free end.

6. The photovoltaic connector with good contact performance according to claim 5, wherein a plurality of first clamping members (1263) are uniformly provided on the outer surface of the first pressing member (126) at one end far away from the plug connector (2); one end of the first clamping member (1263) close to the plug connector (2) is connected with the outer surface of the first pressing member (126), and one end far away from the plug connector (2) slightly expands outward.

7. The photovoltaic connector with good contact performance according to claim 1, wherein the male terminal (22) comprises a second contact (221), a second extension (222) and a second connecting member (223) which are connected in sequence; the second contact (221) is provided with at least one jack (2211) at one end close to the socket connector (1), an elastic member (2212) is provided in the jack (2211); and the convex bodies (2213) are provided on one end of the elastic member (2212) close to the socket connector (1), respectively.

8. The photovoltaic connector with good contact performance according to claim 7, wherein the male terminal (22) further comprises a stop member (226) clamped on the male terminal (22), the outer surface of the stop member (226) is uniformly provided with a plurality of second clamping members (2261); one end of the second clamping member (2261) close to the second contact (221) is connected with the outer surface of the stop member (226) and one end thereof far away from the second contact (221) slightly expands outward.

9. The photovoltaic connector with good contact performance according to claim 8, wherein a third annular clamping groove (224) is formed at the joint of the second extension (222) of the male terminal (22) and the second contact (221); a fourth annular clamping groove (225) is formed at the joint of the second extension (222) and the second connecting member (223);

the stop member (226) is clamped on the second extension (222); one end of the stop member (226) abuts against the third annular clamping groove (224), and the other end thereof abuts against the fourth annular clamping groove (225).

10. The photovoltaic connector with good contact performance according to claim 1, wherein the plug body (21) of the plug connector (2) comprises a second body part (211) and a second connecting part (212) extending from the second body part (211) towards the second rear cover (23); the second body part (211) is provided with a first clamping hole (2113) and a second clamping hole (2114) at the position where the second body part abuts against the socket connector (1), respectively.

11. The photovoltaic connector with good contact performance according to claim 10, wherein the plug connector (2) further comprises a second waterproof sleeve (25), the second waterproof sleeve (25) comprises a third mating part (251) provided in the second connecting part (212) and a fourth mating part (252) extending from the third mating part (251) in the direction away from the second connecting part (212); the outer diameter of the third mating part (251) is larger than that of the fourth mating part (252);

the inner diameter of the second waterproof sleeve (25) from the third mating part (251) to the fourth mating part (252) gradually decreases; the inner wall of the fourth mating part (252) is provided with a plurality of second ribs (2521) at intervals; and the second rib (2521) is provided in an annular structure.

12. The photovoltaic connector with good contact performance according to claim 11, wherein a second fastener (24) is sleeved outside the second waterproof sleeve (25), the second fastener (24) comprises a second base (241), a plurality of second elastic parts (242) extending from the surface of the second base (241) in the direction away from the second connecting part (212), and a second inserting part (243) extending from the surface of the second base (241) in the direction close to the second connecting part (212), the outer diameter of the second inserting part (243) is larger than that of the second base (241); and the second inserting part (243) abuts against the third matching part (251) of the second waterproof sleeve (25).

13. The photovoltaic connector with good contact performance according to claim 12, wherein the second connecting part (212) is provided with a plurality of third serrated protrusions (2122) at one end edge far away from the second body part (211); the second base (241) is provided with a plurality of fourth serrated protrusions (2412) at one end edge close to the second connecting part (212); and the second fastener (24) is engaged with the second connecting part (212).

14. The photovoltaic connector with good contact performance according to claim 10, wherein the socket body (11) of the socket connector (1) comprises a first body part (111), a butting part (112) extending from the middle of the first body part (111) along the butting direction and having a hollow tubular structure, buckling arms (113) provided on both sides of the butting part (112), respectively, and a first connecting part (114) extending from the first body part (111) towards the first back cover (13); and the buckling arms (113) are elastically buckled in the first clamping hole (2113) and the second clamping hole (2114), respectively.

15. The photovoltaic connector with good contact performance according to claim 14, wherein the socket body (11) further comprises an installation part (115) provided at one end of the butting part (112) close to the first body part (111), an annular waterproof ring (16) is sleeved on the installation part (115), and the annular waterproof ring (16) has a double-peak structure.

16. The photovoltaic connector with good contact performance according to claim 14, wherein the socket connector (1) further comprises a first waterproof sleeve (15), the first waterproof sleeve (15) comprises a first mating part (151) provided in the first connecting part (114) and a second mating part (152) extending from the first mating part (151) in the direction away from the first connecting part (114); and the outer diameter of the first mating part (151) is larger than that of the second mating part (152);

the inner diameter of the first waterproof sleeve (15) from the first mating part (151) to the second mating part (152) gradually decreases; the inner wall of the second mating part (152) is provided with a plurality of first ribs (1521) at intervals; and the first rib (1521) is provided in an annular structure.

17. The photovoltaic connector with good contact performance according to claim 16, wherein a first fastener (14) is sleeved outside the first waterproof sleeve (15), the first fastener (14) comprises a first base (141), a plurality of first elastic parts (142) extending from the surface of the first base (141) in the direction away from the first connecting part (114), and a first inserting part (143) extending from the surface of the first base (141) in the direction close to the first connecting part (114), the outer diameter of the first inserting part (143) is smaller than that of the first base (141); and the first inserting part (143) abuts against the first mating part (151) of the first waterproof sleeve (15).

18. The photovoltaic connector with good contact performance according to claim 17, wherein the first connecting part (114) is provided with a plurality of first serrated protrusions (1142) at one end edge far away from the first body part (111); the first base (141) is provided with a plurality of second serrated protrusions (1411) at one end edge close to the first connecting part (114); and the first fastener (14) is engaged with the first connecting part (114).

* * * * *